April 28, 1936. J. B. RIEKER 2,038,680
SHOCK ABSORBER
Filed July 16, 1931 3 Sheets-Sheet 1
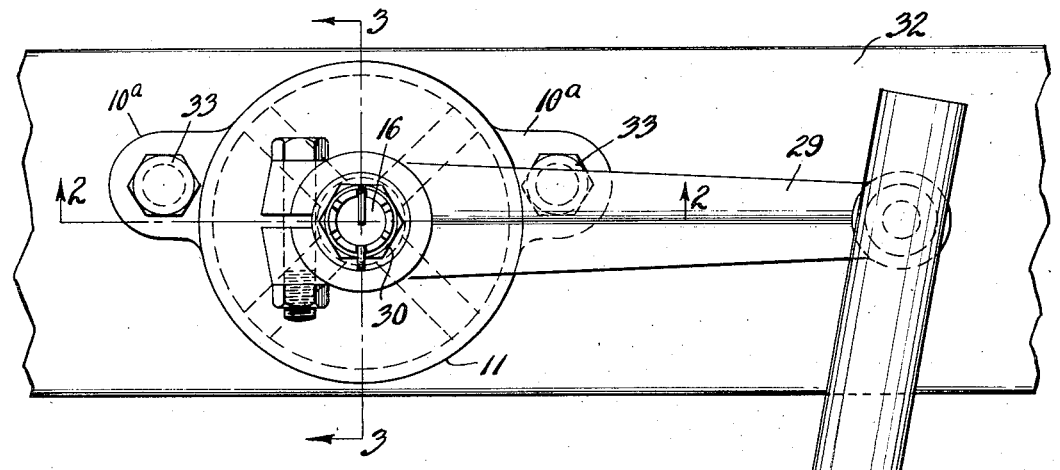
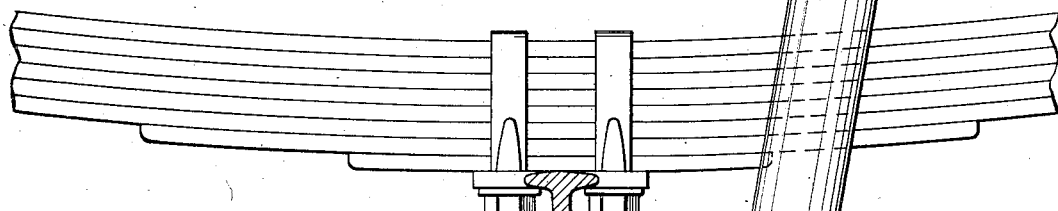
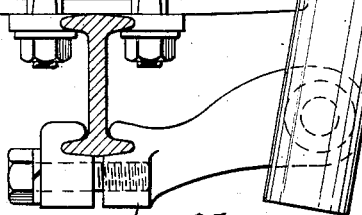
Fig.-1
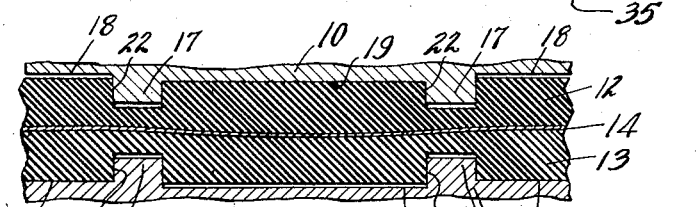
INVENTOR
JOHN B. RIEKER
By Ely & Barrow
ATTORNEYS April 28, 1936.　　　　　J. B. RIEKER　　　　　2,038,680

SHOCK ABSORBER

Filed July 16, 1931　　　3 Sheets-Sheet 2

INVENTOR
JOHN B. RIEKER

BY

ATTORNEYS

April 28, 1936. J. B. RIEKER 2,038,680
SHOCK ABSORBER
Filed July 16, 1931 3 Sheets-Sheet 3

INVENTOR
JOHN B. RIEKER
By
ATTORNEYS

Patented Apr. 28, 1936

2,038,680

UNITED STATES PATENT OFFICE 2,038,680

SHOCK ABSORBER

John B. Rieker, Akron, Ohio

Application July 16, 1931, Serial No. 551,110

8 Claims. (Cl. 267—9)

This invention relates to shock absorbers such as commonly are used on motor vehicles, and more especially it relates to shock absorbers of the mechanical type which utilize elastic material, such as rubber for checking the bound and rebound of the vehicle.

The chief objects of the invention are to provide a shock absorber of the character mentioned which will be more durable than those heretofore proposed; to avoid the imposition of torsional strains on the shock-resisting member; to provide a shock absorber utilizing rubber as a shock absorbing medium in which both bound and rebound will be checked by resistance of the rubber to compression; and to provide such a structure in which the expansive force of the compressed rubber will not react to accelerate the return movement of the rubber-compressing member.

Of the accompanying drawings;

Figure 1 is a front elevation of a shock absorber embodying the invention in its preferred form, as it is applied to the chassis of a motor vehicle;

Figure 5 is a development of a portion of the periphery of the operative elements of the device in normal inoperative position; and Figure 6 is a view similar to Figure 5 with the respective elements in operative position.

Figure 2:
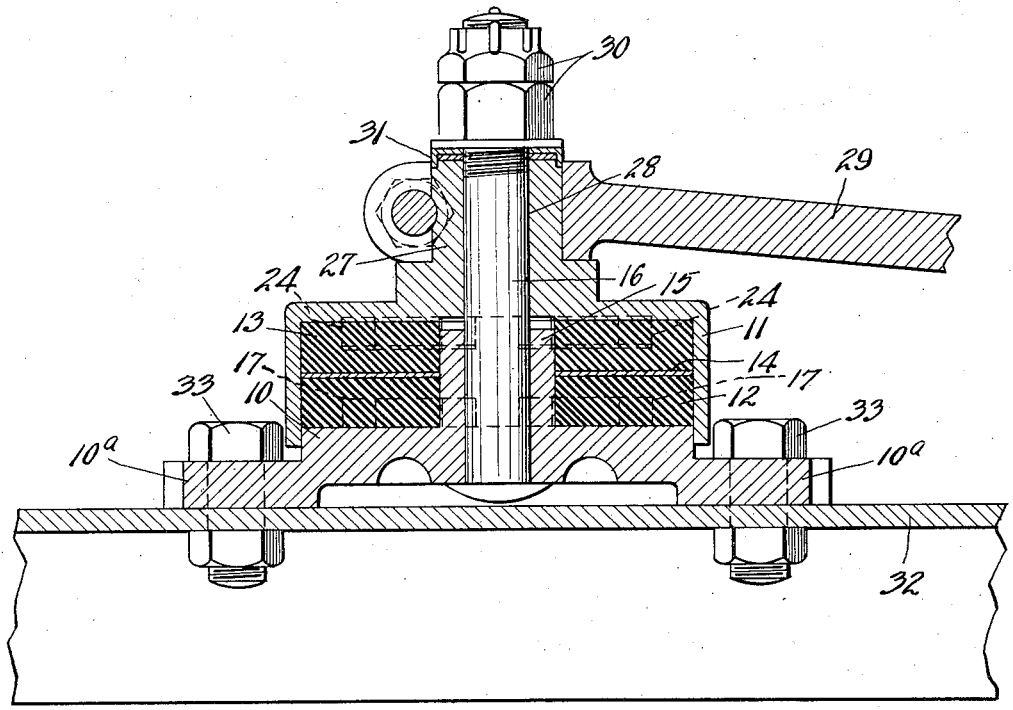
Figure 2 is a section on the line 2—2 of Figure 1.
Figure 3:
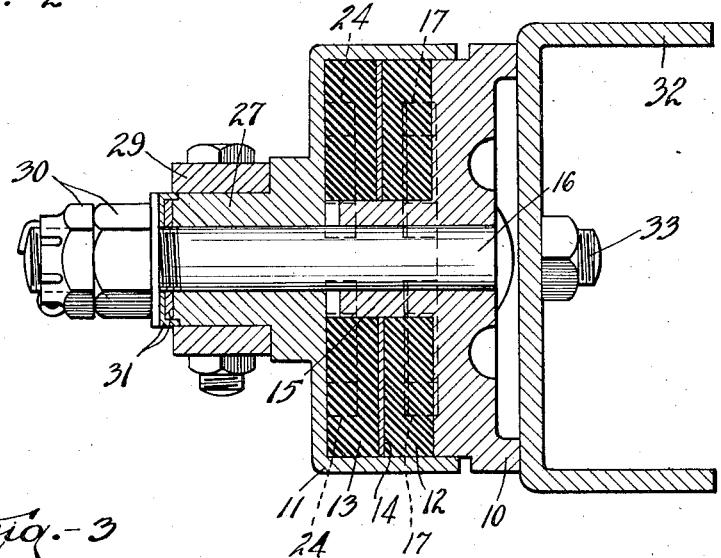
Figure 3 is a section on the line 3—3 of Figure 1.
Figure 4:
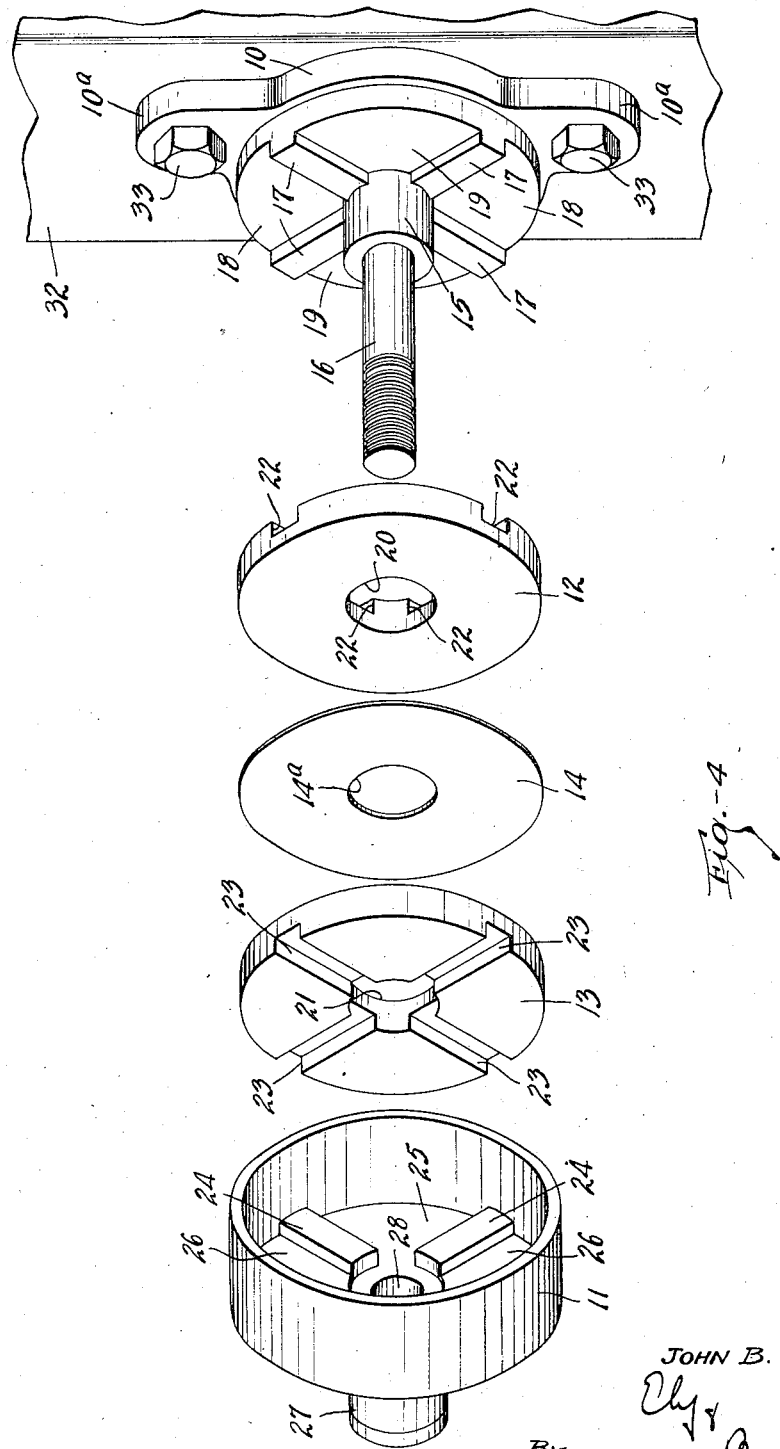
Figure 4 is a perspective view of the respective operative elements of the device arranged in the same relative positions they occupy in the assembled structure.

Referring to the drawings, the shock absorber comprises a housing consisting of a base member 10 and an annular cup-shaped cover 11, which members telescope with each other, a pair of resilient rubber discs 12, 13 of identical size and shape, and a metal washer 14. The member 10 is formed with an annular axial boss 15 which extends from its front face and projecting axially from said boss is a threaded stud or bolt 16. The member 10 also is formed on its front face with four upstanding radial ribs 17, 17 of uniform height which define intervening sector-shaped recesses 18, 18 19, 19, the recesses 18, 18 being disposed in diametrically opposed relation and being of somewhat greater depth, as measured from the tops of the ribs 17, than the recesses 19, 19, as is most clearly shown in Figure 4. The base member 10 also is formed with outwardly extending apertured ears 10ª, 10ª by which it may be mounted on a suitable support.

Each of the rubber discs 12, 13 is of suitable diameter to fit nicely within the cover 11, and each is formed with an axial aperture 20, 21 respectively of suitable size to slide over the boss 15 of the member 10. Both rubber discs are formed on one side with four radial slots 22, 23 respectively which slots are the same width as the ribs 17 of the base member 10, and are of the same depth as the recessed sectors 18 of the said member.

The washer 14 is composed of relatively thin, flexible metal, is easily deformable, and has an axial aperture 14ª of the same size as the apertures 20, 21 of the rubber discs.

The cover 11 has its bottom wall formed with four radial ribs 24, 24 which define intervening sector-shaped recesses 25, 26, the recesses 25 being of the same depth as the recesses 18 of the base member 10, and the recesses 26 being of the same depth as the shallower recesses 19 in said member. Exteriorly the cover 11 is formed with an annular boss 27, and the cover structure has an axial bore 28 to receive the bolt or stud 16. An operating lever 29 is mounted upon the boss 27 and extends radially therefrom.

The shock absorber is assembled with the rubber disc 12 adjacent the base member 10 and the ribs of the latter interfitting with the slots 22 of the disc. The washer 14 abuts the plane face of the disc 12, and also the plane face of the rubber disc 13, the slotted face of the latter being reversed with respect to slotted face of the disc 12. The radial ribs 24 of the cover 11 interfit with the respective slots 23 of the rubber disc 13, and the cover is so positioned angularly of the base member 10, that in the inoperative position of the elements of the device the deep sector shaped recesses 25 of the cover are in alignment with the shallow recesses 19 of the base member, and the shallow recesses 26 of the cover are aligned with the deep recesses 18 of the base member, which is the relative positions of the parts shown in Figure 4. The assembled parts are drawn forcibly together by lock-nuts 30, 30 on the end of the bolt 16 which extends through the structure, with the result that the discs 12, 13, and the washers 14 are distorted out of their natural plane form substantially into the shapes shown in Figure 5, and the deep recesses 25, 18 of the housing members are substantially but not quite filled.

The cup-shaped cover telescopes with the front face of the base member 10 completely to enclose the rubber discs 12, 13 and the washer 14, and suitable oil lubricant or graphite is placed within the housing to facilitate relative angular movement of the discs 12, 13 and the washer 14. If oil lubricant is used, a pair of suitable washers 31 are positioned between the inner nut 30 and the boss 27 to prevent the escape of oil along the bolt 16.

The shock absorber is mounted upon a frame member 32 of a vehicle by means of bolts 33, 33 which pass through the respective apertured ears 10ª. The operating lever 29 is horizontally disposed in normal inoperative position, and its free end is connected by a link 34 to a suitable bracket 35 mounted upon the axle of the vehicle.

In the operation of the device, as the vehicle passes over bumps or depressions in a roadway, the vehicle frame and axle move toward and away from each other, and the housing cover 11 is moved angularly with relation to the base member 10, in both directions, by reason of the connections consisting of the lever 29, link 34 and bracket 35. The result of the angular movement of the cover 11 will best be understood by reference to Figure 6 wherein the member 11 in moving in the direction indicated by the arrow has moved the ribs 24 out of alignment with the ribs 17 and moved the shallow recesses 26, 19 toward each other. It will be obvious that two shallow recesses 26, 19 have less volumetric capacity than a shallow and a deep recess, so that in the moving of the shallow recesses angularly toward alignment with each other, the intervening rubber is subjected to compressive force which it yieldingly resists and thereby cushions the bound and rebound of the vehicle. Because the rubber discs are compressed in an axial direction by a member moving in transverse direction, there will be no such reaction of the rubber as to accelerate the movement of the said member in the opposite direction. During relative angular movement of the cover 11 on the base member 10 the disc 13 moves with the cover, relatively of the disc 12, because of the lubricated washer 14 between them, so that the discs are subjected to but little torsional strain.

The device is of simple construction, and the rubber members long wearing though easily replaceable when required.

The device is susceptible of modification within the scope of the appended claims, which are not limited wholly to the specific construction shown and described.

What is claimed is:

1. A shock absorber comprising a pair of housing members movable angularly relatively of each other, adjustable means connecting said members adapted to draw them toward each other, a pair of resilient members occupying most but not all of the space within said housing and engaging the adjacent faces of said housing members so as to move angularly with them, said resilient members being opposed to each other and having their adjacent faces formed with normally interfitted complemental depressions and elevations whereby relative angular movement of said housing members and resilient members results in the deforming of the resilient members by leveling of the depressions and elevations thereof, and means between said resilient members facilitating sliding movement of one of them relatively of the other.

2. A combination as defined in claim 1 in which the means between the resilient members comprises a flexible metal disc.

3. A shock absorber comprising a stationary member and a member movable angularly thereof, the said members being formed with projections on their adjacent faces and alternate deep and shallow recesses between said projections, the deep recesses of one member normally being opposite the shallow recesses of the other member, respective discs of resilient material between said members formed with complementally arranged slots on one side in which said projections are engaged, said discs otherwise being of uniform thickness and having opposed normally plane faces that are slidable relatively of each other upon angular movement of the movable member, and means for drawing the assembly forcibly together whereby the resilient members are so deformed as to impart a complementally irregular configuration to their opposed faces.

4. A combination as defined in claim 3 including a flexible metal washer between the opposed faces of the resilient members, which washer is deformed by the deforming of the resilient members.

5. A shock absorber comprising a stationary member and a member movable angularly thereof, said members being formed with alternate deep and shallow recesses, the shallow recesses of each member being normally aligned with the deep recesses of the other member, a pair of resilient members of rubber formed with elevations of uniform height which seat in said recesses in the respective stationary and movable members, and positive means for drawing the assembly together in an axial direction whereby the resilient members are laterally distorted out of their normal planes and the said stationary and movable members are established in fixed axial relation.

6. A combination as defined in claim 8 including a lubricant between the resilient discs, to facilitate relative movement thereof.

7. A shock absorber comprising a housing consisting of two angularly movable members that are spaced apart a determinate distance, the adjacent faces of said members being formed with alternate deep and shallow recesses, the deep recesses of one member being aligned with the shallow recesses of the other member in the neutral position of the device, a structure comprising a pair of opposed discs of resilient material between said members filling the shallow recesses of each of them but not the deep recesses thereof, and means for moving said housing members axially toward each other to effect such a deforming of the discs that when the housing members are moved angularly relatively of each other the resulting relative angular movement of the discs will cause the latter to be subjected to increased axially directed pressure.

8. A shock absorber comprising a housing consisting of two relatively movable members, means for drawing said members toward each other, two discs of resilient material that have opposed, normally plane faces that are slidable one upon the other within said housing, said housing members interfitting with the respective discs and being so shaped as complementally to deform the latter, by imparting non-planar form to their opposed faces, when drawn toward each other, and means for moving the housing members angularly relatively of each other whereby the complementally deformed portions of the resilient discs are subjected to further deforming pressure.

JOHN B. RIEKER.